United States Patent
Cohen et al.

(10) Patent No.: US 7,386,884 B2
(45) Date of Patent: Jun. 10, 2008

(54) METHOD FOR PREVENTING ACTIVATION OF MALICIOUS OBJECTS

(75) Inventors: Oded Cohen, Tivon (IL); Yanki Margalit, Ramat-Gan (IL); Dany Margalit, Ramat-Gan (IL)

(73) Assignee: Aladdin Knowledge Systems Ltd., Petach Tikva (IL)

( * ) Notice: Subject to any disclaimer, the term of this patent is extended or adjusted under 35 U.S.C. 154(b) by 449 days.

(21) Appl. No.: 10/826,503

(22) Filed: Apr. 19, 2004

(65) Prior Publication Data

US 2005/0235160 A1 Oct. 20, 2005

(51) Int. Cl.
*G06F 12/14* (2006.01)
(52) U.S. Cl. .................... 726/22; 713/161
(58) Field of Classification Search ........... 726/22–23; 713/161
See application file for complete search history.

(56) References Cited

U.S. PATENT DOCUMENTS 6,088,803 A * 7/2000 Tso et al. ............ 726/22
2004/0054928 A1* 3/2004 Hall ..................... 713/201

* cited by examiner

*Primary Examiner*—Gilberto Barron, Jr.
*Assistant Examiner*—Jacob Lipman
(74) *Attorney, Agent, or Firm*—Mark M. Friedman

(57) ABSTRACT

A method for preventing activating a malicious object passing through a checkpoint, and decreasing the overall inspection delay thereof, the method comprising the steps of: (a) at the checkpoint, creating an envelope file, being an executable file comprising: the object; code for extracting the object from the envelope file; and an indicator for indicating the integrity of the object; (b) forwarding the envelope file instead of the object toward its destination, while holding at least a part of the envelope file which comprises the indicator; (c) inspecting the object; and (d) setting the indicator on the envelope file to indicate the inspection result thereof, and releasing the rest of the envelope file.

10 Claims, 4 Drawing Sheets

METHOD FOR PREVENTING ACTIVATION OF MALICIOUS OBJECTS

FIELD OF THE INVENTION

The present invention relates to the field of detecting viruses and other malicious forms in a checkpoint (e.g. gateway). More particularly, the invention relates to a method for preventing activation of malicious objects while decreasing the overall inspection time.

BACKGROUND OF THE INVENTION

The term "gateway" refers in the art to a bridge between two networks. For each network, the gateway is a point that acts as an entrance to another network. From the implementation point of view, a gateway is often associated with both a router, which knows where to direct a given packet that arrives to the gateway and a switch, which provides the packet with the actual path in and out of the gateway. Due to its nature, the gateway to a local network is a proper point for checking out objects (e.g. files and email messages) that pass through it, in order to detect viruses and other forms of maliciousness ("inspection") before reaching the user.

As a filtering facility, a gateway server has to deal with two contradicting objects: on the one hand, it has to hold a file that reaches the gateway in its path from a source to a destination until the inspection indicates it is harmless and thereby prevents its execution on the destination site, on the other hand holding a file at the gateway server until the inspection process terminates which results in a bottleneck to data traffic passing through the gateway.

Inspection activity has a substantial influence on the traffic speed through a gateway. U.S. patent application Ser. No. 10/002,407, titled as Security Router, deals with this problem by skipping the inspection of trusted files. According to this invention, since multimedia files (e.g. JPG files) do not comprise executable code (according to their definition), these files are not inspected, thereby diminishing the delay caused by the inspection process.

U.S. patent application Ser. No. 09/498,093, titled as "Protection of computer networks against malicious content", deals with this problem by holding in a checkpoint (e.g. a gateway) only a part of the file, such as the last packet of the file, and releasing it once the file has been indicated as harmless. This way the majority of the file is not delayed at the gateway, but its execution at the destination site cannot be carried out until the last part reaches the destination. This solution is applicable only for files that in order to be executed or activated, the whole file has to be available on the executing platform. However, if the executing platform activates a file even in the case where only a part of the file is available, the executing platform is exposed to viruses and other malicious forms.

Furthermore, some inspection methods, such as CRC-based methods, require that the whole file be available during the inspection process. Files that should be fully accessible for inspection, may cause a substantial delay to the traffic through a checkpoint since the inspection can start only after the whole file is accessible to the inspection facility. Thus, in this case, the parts of a file should be accumulated and held at the inspection point until the inspection indicates that it is harmless, and only then the file may be "released" to its destination.

It is an object of the present invention to provide a method for preventing activation of malicious objects.

It is a further object of the present invention to provide a method for preventing from a checkpoint the activation of malicious objects on the executing platform.

It is a still further object of the present invention to provide a method for inspecting a file on a checkpoint, by which the delay thereof is decreased in comparable to the prior art.

Other objects and advantages of the invention will become apparent as the description proceeds.

SUMMARY OF THE INVENTION

A method for preventing activating a malicious object passing through a checkpoint, and decreasing the overall inspection delay thereof, the method comprising the steps of: (a) at the checkpoint, creating an envelope file, being an executable file comprising: the object; code for extracting the object from the envelope file; and an indicator for indicating the integrity of the object; (b) forwarding the envelope file instead of the object toward its destination, while holding at least a part of the envelope file which comprises the indicator; (c) inspecting the object; and (d) setting the indicator on the envelope file to indicate the inspection result thereof, and releasing the rest of the envelope file.

According to a preferred embodiment of the invention, the envelope file is an auto-executable file. According to one embodiment of the invention, the name of the envelope file is identical to the name of the inspected object. According to another embodiment of the invention, the name of the envelope file differs than the name of the inspected object.

The indicator may be a CRC of a part of the envelope file, a CRC of a part of the inspected object, a checksum of a part of the envelope file, a checksum of a part of the inspected object, a value stored within the envelope file, absence of a part of the envelope file, absence of a part of the inspected object, and so forth.

According to a preferred embodiment of the invention, the envelope file further comprises code for displaying an acknowledgment to the user for indicating the integrity of the inspected object. Typically the acknowledgment is displayed only when the inspected objects is indicated as malicious.

BRIEF DESCRIPTION OF THE DRAWINGS

The present invention may be better understood in conjunction with the following figures.

DETAILED DESCRIPTION OF PREFERRED EMBODIMENTS

The term "checkpoint" refers herein to a point on a data channel or data junction in which the passing data is inspected. For example, a gateway is a suitable place for a checkpoint.

Figure 1:
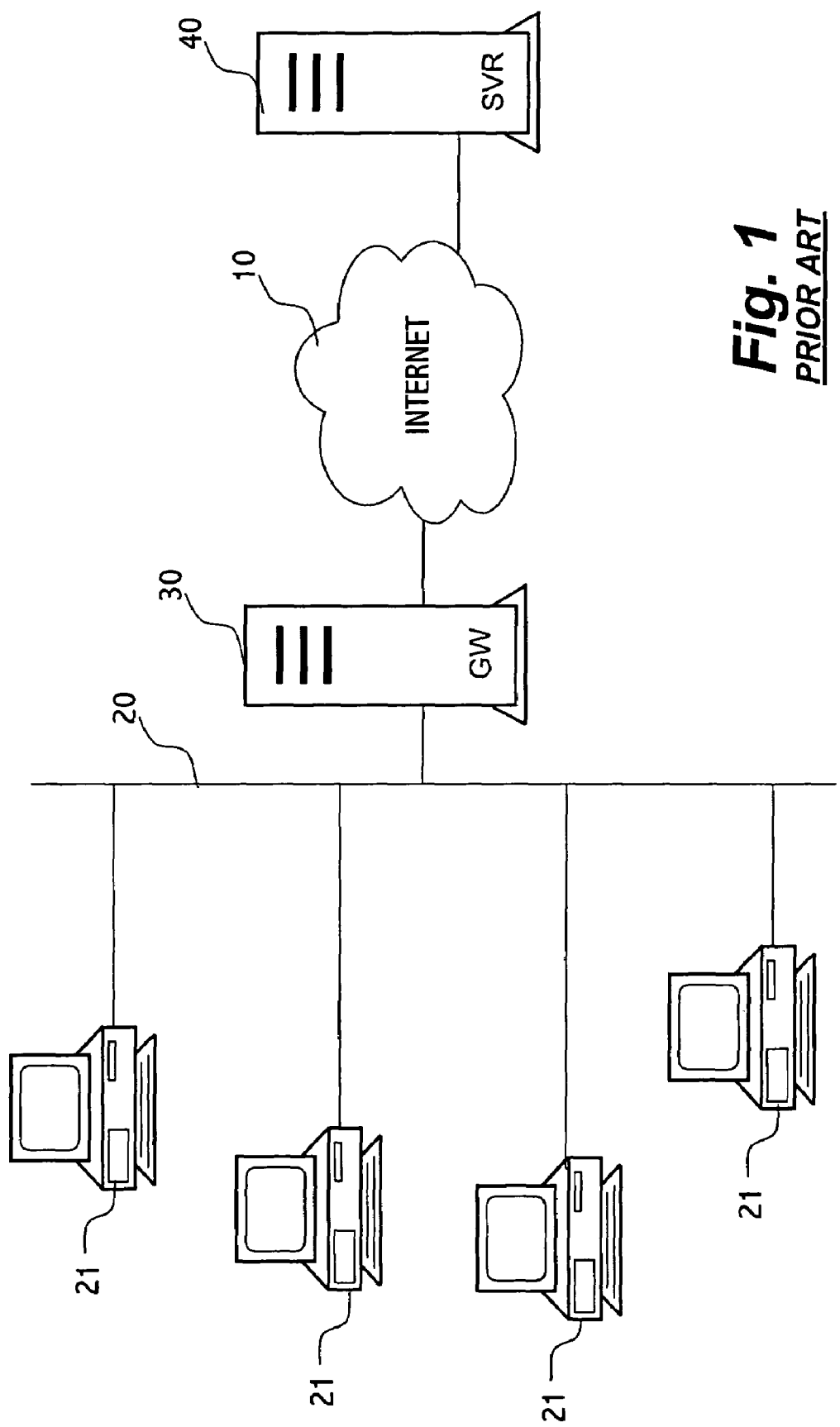
FIG. 1 schematically illustrates a system that may be used for implementing the present invention.

FIG. 1 schematically illustrates a system that may be used for implementing the present invention. The computers 21 are connected to the local area network 20. The local area network 20 is connected to the internet 10. The gateway server 30 is interposed between the local area network 20 and the internet 10. The Internet server 40 hosts web sites. A browser being executed on a computer 21 that addresses to the web site hosted by the internet server 40 cause files to be transferred from the internet server 40 to the computer 21 through the gateway server 30.

As mentioned above, a gateway server that inspects data that is transferred through it, has to deal with two contradicting objects: on the one hand, it has to hold an inspected object until its harmlessness is indicated, on the other hand holding the file at the gateway may cause a bottleneck to the data traffic passing through the gateway.

This problem is solved by the present invention. The present invention allows passing a file toward its destination while inspecting the file, and still preventing the activation of the file at the destination site until its integrity is indicated. This is carried out as follows: instead of forwarding the original file to its destination, a substitute file which comprises the original file is constructed and transmitted to the destination. The substitute file is also referred herein as envelope file.

According to one embodiment of the invention, the envelope file is an executable which comprises the following parts:
  the original file;
  an indicator about the integrity of the original file; and
  an executable part, upon which execution extracts the original file, and executes it.

At the destination site, the envelope file is executed instead of the original file. On this execution, if the integrity indicator indicates that the original file is harmless, the original file is extracted from the envelope file and executed.

The integrity indicator can be the CRC (Cyclic Redundancy Checks) or checksum of the envelope file, the CRC or checksum of the original file, a bit within the envelope file, a value stored within the envelope file (in a byte, a bit, etc.), and so forth. In order to prevent forge of the envelope file, the indicator and/or the envelope file can be secured (e.g. encrypted, digitally signed with the original or envelope file, and so forth).

For example, in the case where the integrity of the original file is indicated at the gateway, the gateway sends the true CRC value of the original file. In case the original file is indicated as comprising malicious content, the gateway sends a wrong CRC value of the original file. As well, other indicators can be used.

It should be noted that the envelope file performs two operations: on the one hand it is an executable file, which is loaded into the computer's memory for executing, but on the other hand it is treated as a data file.

Figure 2:
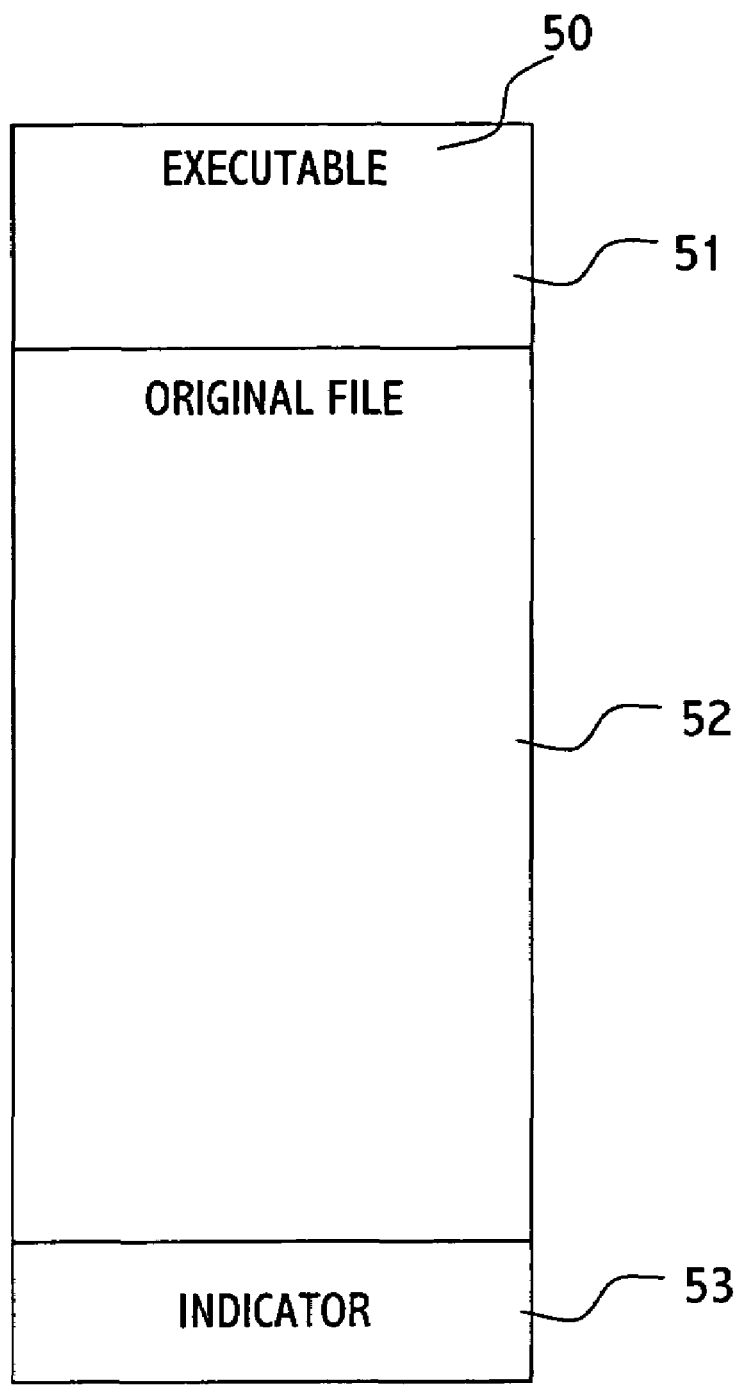
FIG. 2 schematically illustrates the parts of an envelope file, according to a preferred embodiment of the present invention.

FIG. 2 schematically illustrates the parts of an envelope file, according to a preferred embodiment of the present invention. The envelope file 50 comprises:
  an executable part 51;
  the original file 52; and
  an integrity indicator 53.

Figure 3:
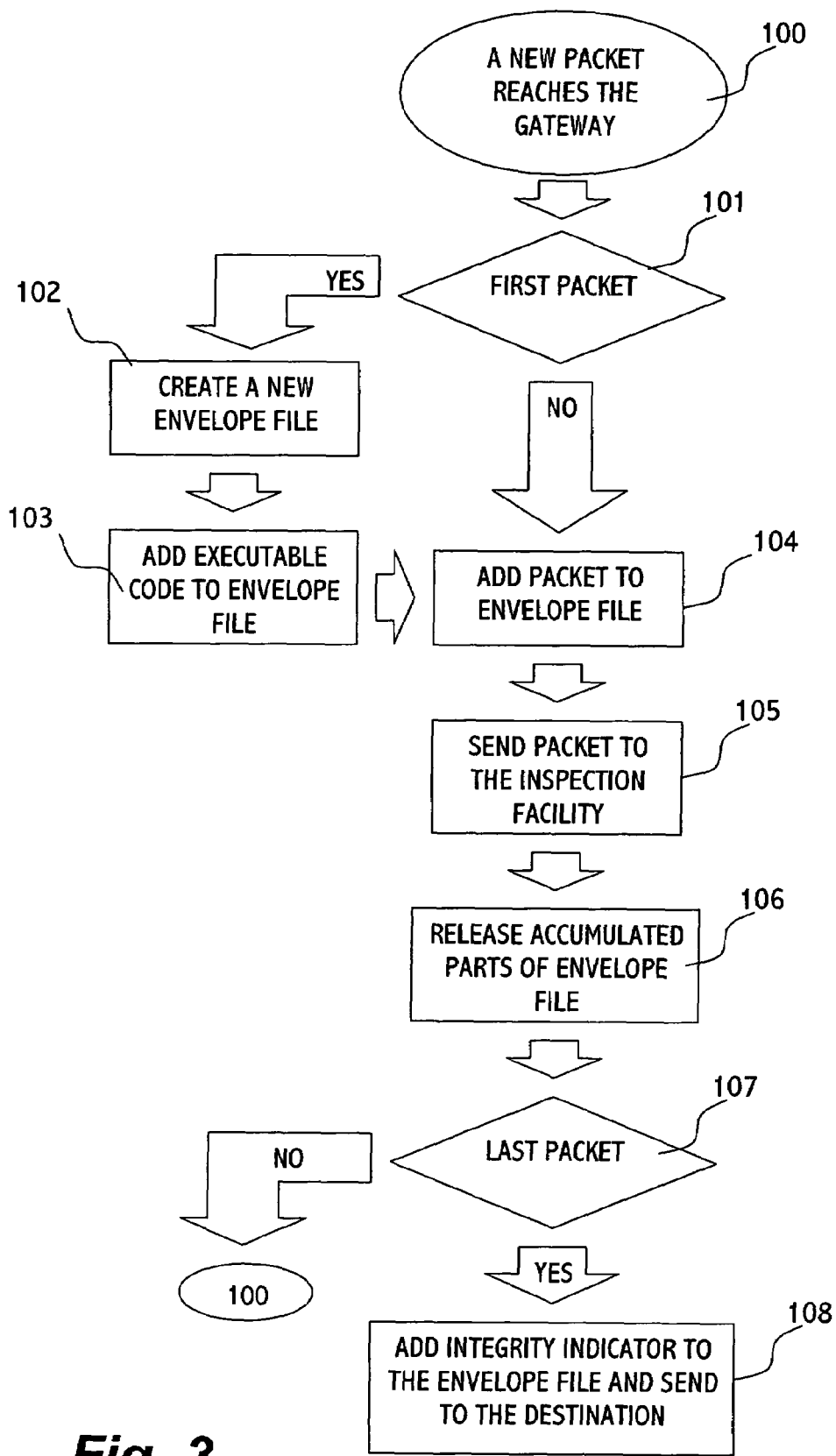
FIG. 3 is a flowchart of a process for creating an envelope file, according to a preferred embodiment of the invention.

FIG. 3 is a flowchart of a process for creating an envelope file, according to a preferred embodiment of the invention.
  The process starts at block 100, where a packet of a file sent from a source to a destination reaches to a gateway server (or, generally, a checkpoint).
  From block 101, if the packet is the first packet of a file then the process continues with block 102, where a new envelope file is created, and therefrom with block 103, where an executable code is added to the created envelope file, and therefrom to block 104. The operation of the executable code is detailed in the description of FIG. 4.
  At block 104, the packet is added to the envelope file.
  At block 105, a copy of the packet is sent to the inspection facility for inspection.
  At block 106, the accumulated parts of the envelope file are sent to the destination.
  From block 107, if the reached packet is the last packet of the file, then an integrity indicator is added to the envelope file, and the last accumulated parts of the envelope file are sent to the destination. The integrity indicator is received from the inspection facility which operates at the gateway. If the received packet is not the last packet of the original file, then when a new packet of the original file will reach to the gateway server, the process will continue from block 100.

In this example it was assumed that the packets of a file reach the gateway in consecutive order, however, as known to a person of ordinary skill in the art, this is not necessarily true, since each packet may be redirected to its destination through a different path. Thus, when adding a packet of the original file to the envelope file, the order should be taken into consideration. However, according to a preferred embodiment of the invention, the indicator is stored within the last part of the envelope file. This way usually (but not always) the integrity indicator will be the last to reach the destination.

Figure 4:
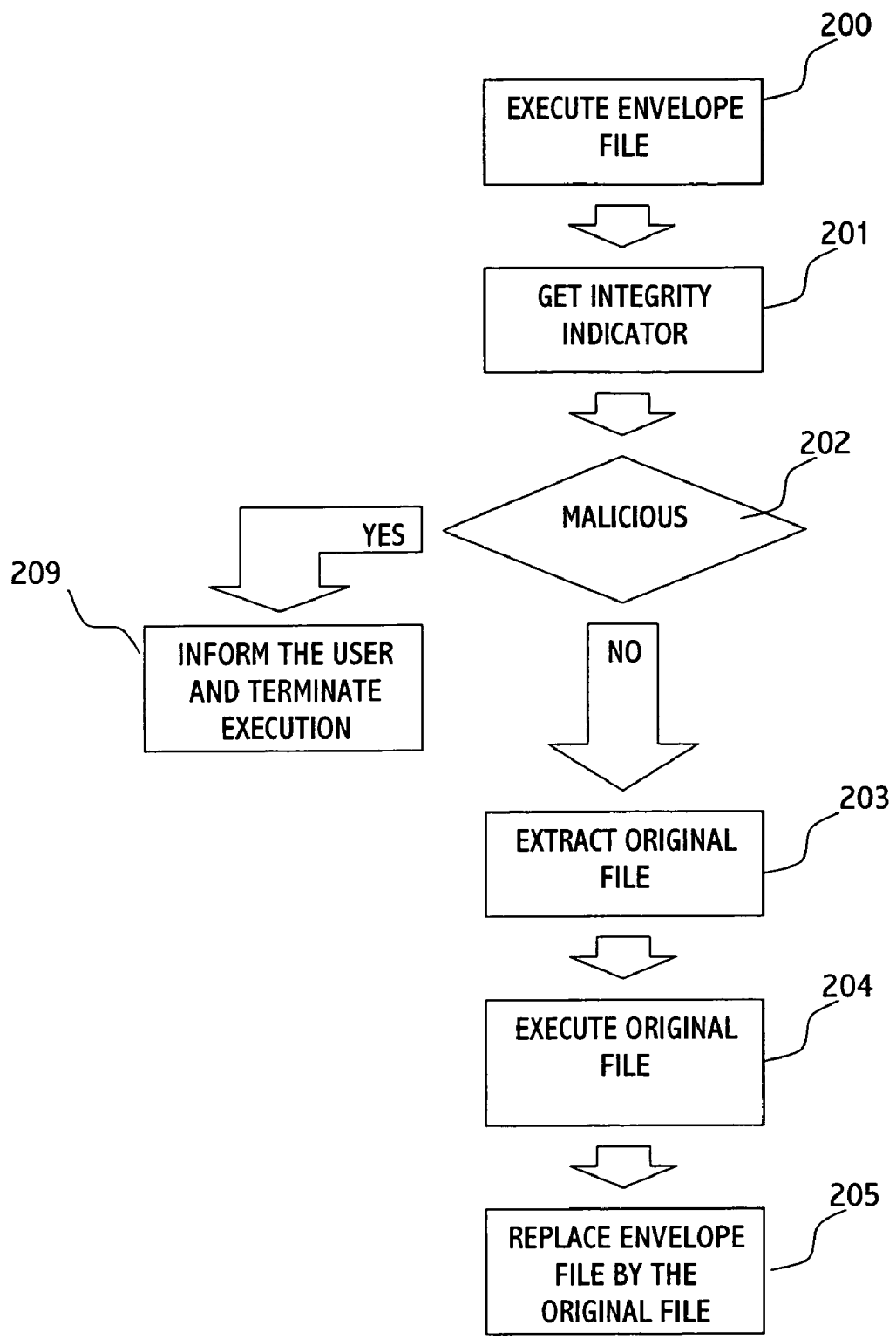
FIG. 4 is a flowchart of a process carried out by an envelope file on the destination site, according to a preferred embodiment of the invention.

FIG. 4 is a flowchart of a process carried out by an envelope file on the destination site, according to a preferred embodiment of the invention.
  At block 200 the envelope file is executed.
  At block 201, the executed envelope program gets the integrity indicator. As mentioned above, the envelope file is also used as a data file which comprises the original file and an integrity indicator.
  From block 202, if according to the integrity indicator the original file is malicious, then at block 209 the envelope file acknowledges the user (e.g. by displaying a corresponding message), and the execution of the envelope file terminates, otherwise control continues with block 203.
  At block 203, the envelope program extracts the original file from the envelope file.
  At block 204, the original file is executed. At this point the envelope executable can terminate.
  At block 205, since the envelope file is not required anymore, it can be replaced by the original file.

Typically the inspected object is an executable, however it should be noted that the invention can also be implemented for other file types, whether it is an executable or not, or whether it is attached to an email message or returned in an FTP or HTTP session.

It should also be noted that although the references herein are to a gateway, the invention can be implemented to any kind of checkpoint, e.g. an arbitrary point on a network, a server of an Internet service provider, a mail server, and so forth.

Those skilled in the art will appreciate that the invention can be embodied by other forms and ways, without losing the scope of the invention. The embodiments described herein should be considered as illustrative and not restrictive.

The invention claimed is:

1. A method for preventing activating a malicious object passing through a checkpoint, and decreasing the overall inspection delay thereof, the method comprising the steps of:
   a. at said checkpoint, creating an envelope file, being an executable file comprising: said object; code for extracting said object from said envelope file; and an indicator for indicating the integrity of said object;
   b. forwarding said envelope file instead of said object toward its destination, while holding at least a part of said envelope file which comprises said indicator;
   c. inspecting said object;
   d. setting said indicator on said envelope file to indicate the inspection result thereof, and
   e. releasing the rest of said envelope file.

2. A method according to claim 1, wherein said checkpoint is selected from a group comprising: a gateway server, a proxy server.

3. A method according to claim 1, wherein the name of said envelope file is identical to the name of the inspected object.

4. A method according to claim 1, wherein the name of said envelope file differs than the name of the inspected object.

5. A method according to claim 1, wherein said indicator is selected from a group comprising: a CRC of at least one part of said envelope file, a CRC of at least one part of said inspected object, a checksum of at least one part of said envelope file, a checksum of at least one part of said inspected object, a value stored within said envelope file, absence of a part of said envelope file, absence of a part of said object.

6. A method according to claim 1, wherein at least a part of said object is secured.

7. A method according to claim 1, wherein at least a part of said envelope file is secured.

8. A method according to claim 1, wherein said indicator is stored within the last part of said envelope file.

9. A method according to claim 1, wherein said envelope file further comprises code for displaying an acknowledgment.

10. A method according to claim 9, wherein said acknowledgment indicates integrity of said object.

* * * * *